(12) United States Patent
Dou et al.

(10) Patent No.: US 11,742,607 B2
(45) Date of Patent: Aug. 29, 2023

(54) CONNECTOR HOUSING ASSEMBLY AND CHARGING SOCKET CONNECTOR

(71) Applicants: TYCO ELECTRONICS TECHNOLOGY (SIP) LTD., Jiangsu Province (CN); TYCO ELECTRONICS (SHANGHAI) CO., LTD., Shanghai (CN)

(72) Inventors: Renyi (Ronny) Dou, Suzhou (CN); Fangyue (Jason) Zhu, Shanghai (CN); Haomai (Ivan) Yin, Shanghai (CN)

(73) Assignees: TYCO ELECTRONICS TECHNOLOGY (SIP) LTD., Jiangsu Province (CN); TYCO ELECTRONICS (SHANGHAI) CO., LTD., Shanghai (CN)

(*) Notice: Subject to any disclaimer, the term of this patent is extended or adjusted under 35 U.S.C. 154(b) by 86 days.

(21) Appl. No.: 17/481,744

(22) Filed: Sep. 22, 2021

(65) Prior Publication Data
US 2022/0102898 A1 Mar. 31, 2022

(30) Foreign Application Priority Data
Sep. 27, 2020 (CN) .......................... 202022149181.8

(51) Int. Cl.
*H01R 13/514* (2006.01)
*H01R 13/436* (2006.01)
(Continued)

(52) U.S. Cl.
CPC ....... *H01R 13/4362* (2013.01); *H01R 13/514* (2013.01); *H01R 13/631* (2013.01); *H01R 13/639* (2013.01)

(58) Field of Classification Search
CPC .................. H01R 13/4362; H01R 13/4361
See application file for complete search history.

(56) References Cited

U.S. PATENT DOCUMENTS 5,085,599 A * 2/1992 Maejima ............ H01R 13/4365
439/598
5,299,958 A * 4/1994 Ohsumi ............. H01R 13/4362
439/752

(Continued)

*Primary Examiner* — Neil Abrams
(74) *Attorney, Agent, or Firm* — Potomac Law Group, PLLC

(57) ABSTRACT

The present invention provides a connector housing assembly and a charging socket connector. The connector housing assembly has a housing configured to support a connection terminal; and a lock received in a chamber of the housing. The lock is movably installed in the housing and is adapted to be moved between a pre-locking position and a final locking position; the lock is provided with a blocking structure configured to lock the connection terminal when the lock is moved to the final locking position; the housing is provided with an operation port communicated with the chamber, and the lock is pushed to move between the pre-locking position and the final locking position by a tool inserted into the chamber through the operation port. Compared with the prior art, the assembly process of the connector housing assembly of the present invention is simple, and the productivity is effectively improved. A blind plug may be located in the operation port when the tool is removed from the port.

18 Claims, 7 Drawing Sheets

(51) Int. Cl.
    *H01R 13/631*    (2006.01)
    *H01R 13/639*    (2006.01)

(56) References Cited

U.S. PATENT DOCUMENTS

| | | | | |
|---|---|---|---|---|
| 5,478,262 | A * | 12/1995 | Yamanashi | H01R 13/4362 |
| | | | | 439/752 |
| 5,595,509 | A * | 1/1997 | Fry | H01R 13/4362 |
| | | | | 439/752 |
| 6,139,375 | A * | 10/2000 | Konoya | H01R 13/4361 |
| | | | | 439/752 |
| 6,152,783 | A * | 11/2000 | Tsuchiya | H01R 13/4361 |
| | | | | 439/752 |
| 6,270,376 | B1 * | 8/2001 | Fink | H01R 13/62977 |
| | | | | 439/752 |
| 7,281,939 | B1 * | 10/2007 | Stock | H01R 13/4361 |
| | | | | 439/364 |
| 8,721,374 | B2 * | 5/2014 | Glick | H01R 13/422 |
| | | | | 439/752 |
| 9,318,847 | B2 * | 4/2016 | Endo | H01R 13/639 |
| 11,177,605 | B2 * | 11/2021 | Miyamura | H01R 13/4362 |
| 11,456,553 | B2 * | 9/2022 | Soh | H01R 43/20 |
| 2004/0132351 | A1 * | 7/2004 | Miyakawa | H01R 13/4361 |
| | | | | 439/752 |
| 2022/0102898 | A1 * | 3/2022 | Dou | H01R 13/631 |

\* cited by examiner

CONNECTOR HOUSING ASSEMBLY AND CHARGING SOCKET CONNECTOR

CROSS-REFERENCE TO RELATED APPLICATION

This application claims the benefit of Chinese Patent Application No. 202022149181.8 filed on Sep. 27, 2020 in the State Intellectual Property Office of China, the whole disclosure of which is incorporated herein by reference.

FIELD OF THE INVENTION

The present invention relates to a connector housing assembly and a charging socket connector comprising the connector housing assembly.

DESCRIPTION OF RELATED ART

The charging socket connector is used for realizing an electrical connection with a mating electrical device by inserting the mating electrical device into the charging socket connector. The electric vehicle is charged by plugging an external charging gun into the charging socket connector. The existing charging socket connector is usually transported to a cable factory after the housing and internal parts are assembled, and then the connection components are assembled at the cable factory. When the cable factory assembles the connecting components, it needs to disassemble the housing to fix the connection components in the housing, and then reassemble the housing and internal parts. This kind of assembly process is cumbersome and the production capacity is low.

SUMMARY OF THE INVENTION

The present invention has been made to overcome or alleviate at least one aspect of the above-mentioned disadvantages.

According to an aspect of the present invention, there is provided a connector housing assembly comprising: a housing configured to support a connection terminal; and a lock received in a chamber of the housing. The lock is movably installed in the housing and is adapted to be moved between a pre-locking position and a final locking position; The lock is provided with a blocking structure configured to lock the connection terminal when the lock is moved to the final locking position; The housing is provided with an operation port communicated with the chamber, and the lock is pushed to move between the pre-locking position and the final locking position by a tool inserted into the chamber through the operation port.

According to an exemplary embodiment of the present invention, the lock is provided with an operation part corresponding to the operation port, and the tool drives the lock to move between the pre-locking position and the final locking position by pushing the operation part.

According to another exemplary embodiment of the present invention, the operation part of the lock is aligned with the operation port of the housing along an axial direction of the connector housing assembly.

According to another exemplary embodiment of the present invention, the operation part comprises a slot provided on the lock, and the tool is adapted to be inserted into the slot of the operation part.

According to another exemplary embodiment of the present invention, the operation part comprises a protruding block formed on the lock, and the protruding block is adapted to match with the tool.

According to another exemplary embodiment of the present invention, the operation part comprises two protruding blocks formed on the lock and spaced from each other, and the tool is adapted to be inserted into a slot defined between the two protruding blocks.

According to another exemplary embodiment of the present invention, the housing comprises a housing seat and a cover covered on the housing seat, the chamber is surrounded by the housing seat and the cover, and the operation port is provided on the cover.

According to another exemplary embodiment of the present invention, the connector housing assembly further comprises a lead frame on which a connection circuit is arranged. The lead frame and the lock are formed into a single integral piece by injection molding.

According to another exemplary embodiment of the present invention, the connector housing assembly further comprises a blind plug adapted to be plugged into and seal the operation port, so as to ensure the air tightness of the chamber.

According to another exemplary embodiment of the present invention, the operation port of the housing is served as an air tightness test channel of the connector housing assembly.

According to another aspect of the present invention, there is provided a charging socket connector comprising the above connector housing assembly and a connection assembly. The connection assembly comprises a connection terminal and a cable electrically connected to the connection terminal. The connection terminal is installed in the housing, and the cable extends out of the housing.

In some exemplary embodiments of the present invention, there is provided a connector housing assembly comprising of: a housing configured to support a connection terminal; and a lock received in a chamber of the housing. The lock is movably installed in the housing and is adapted to be moved between a pre-locking position and a final locking position; The lock is provided with a blocking structure configured to lock the connection terminal when the lock is moved to the final locking position; The housing is provided with an operation port communicated with the chamber, and the lock is pushed to move between the pre-locking position and the final locking position by a tool inserted into the chamber through the operation port. Compared with the prior art, the connector housing assembly of the present invention is transported to the cable factory after the assembly of the housing and the lock. When the cable factory assembles the connection assembly, it only needs to insert the connection terminal into the chamber, and then use a tool inserted into the chamber through the operation port to push the lock, so that the lock is moved to the final locking position. At this time, the blocking structure locks the connection terminal, and the assembly of the connector housing assembly is completed. In the above assembly process, it is not necessary to disassemble the housing, which greatly simplifies the assembly process, improves the assembly efficiency, and effectively improves the production capacity.

In some exemplary embodiments of the present invention, there is provided a charging socket connector comprising the above connector housing assembly and a connection assembly. The connection assembly comprises a connection terminal and a cable electrically connected to the connection terminal. The connection terminal is installed in the housing, and the cable extends out of the housing. In the present invention, the assembly process of charging socket connector is simple, and the production capacity is high.

BRIEF DESCRIPTION OF THE DRAWINGS

The above and other features of the present invention will become more apparent by describing in detail exemplary embodiments thereof with reference to the accompanying drawings, in which.

Figure 1:
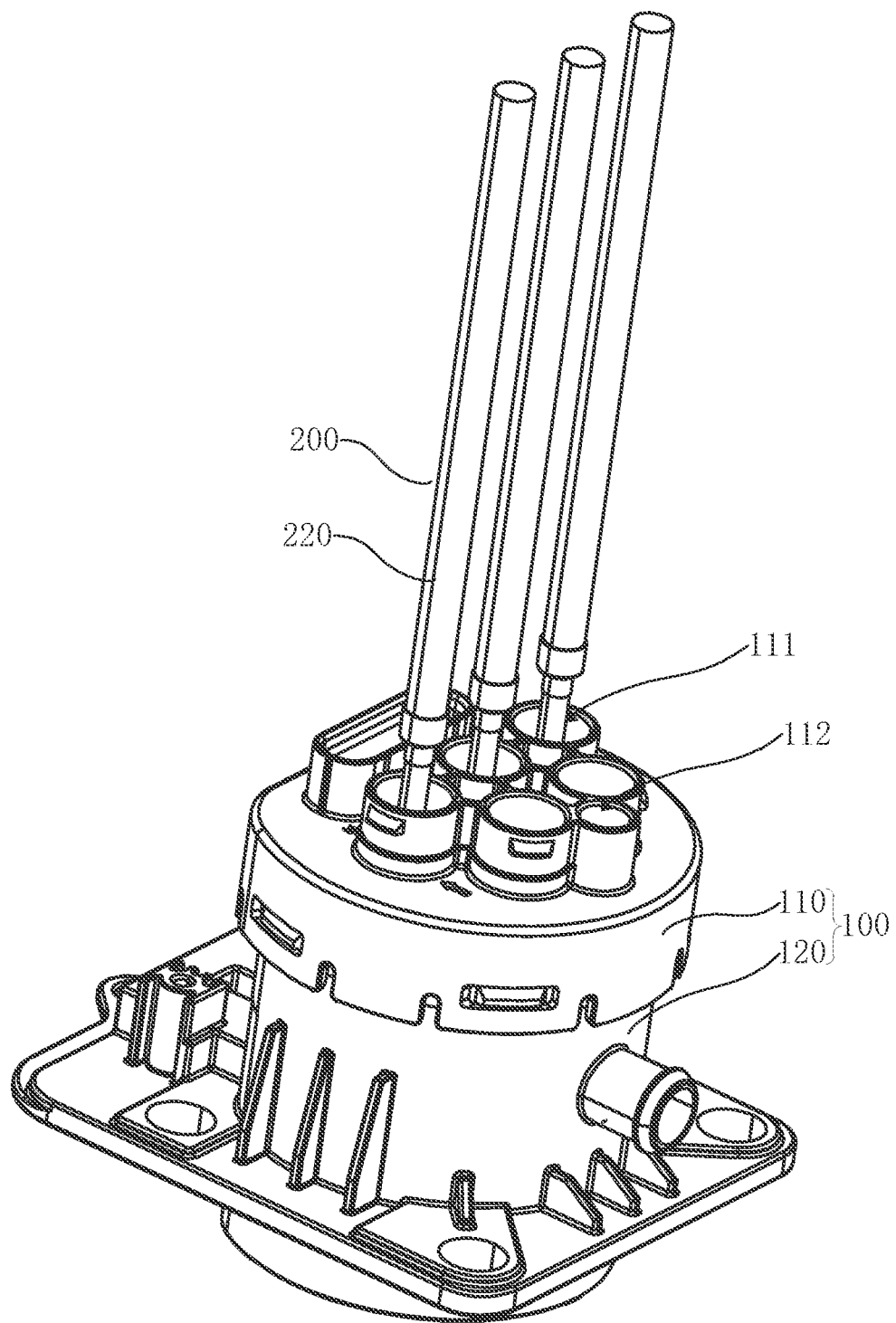
FIG. 1 is an illustrative perspective view of a connector housing assembly according to an exemplary embodiment of the present invention.

Wherein, reference marks in the figures are as follows:
100—housing; 110—cover; 111—first channel; 112—operation port; 120—housing seat; 121—second channel; 122—step; 123—latch slot; 130—chamber; 200—connection assembly; 210—connection terminal; 211—butting part; 220—cable; 230—first waterproof sleeve; 240—second waterproof sleeve; 300—lock; 310—blocking structure; 320—operation part; 321—protruding block; 322—slot; 330—terminal avoidance hole; 340—latch; 400—blind plug.

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It should be noted that when a component is said to be "fixed" or "set" to another component, it can be directly or indirectly on the other component. When a component is said to be "connected" to another component, it can be directly connected to another component or indirectly connected to the other component.

It should be understood that the orientation or position relationship indicated by the terms "length", "width", "up", "down", "front", "back", "left", "right", "vertical", "horizontal", "top", "bottom", "inside", "outside" and so on are based on the orientation or position relationship shown in the figure, only for the convenience of describing the present invention and simplifying the description, Instead of indicating or implying that the device or element must have a specific orientation, be constructed and operated in a specific orientation, it cannot be understood as a limitation of the present invention.

In addition, the terms "first" and "second" are used for descriptive purposes only and cannot be understood as indicating or implying relative importance or implicitly indicating the number of technical features indicated. Thus, the features defined with "first" and "second" can explicitly or implicitly include one or more of the features. In the description of the present invention, "multiple" means two or more, unless otherwise specified.

According to a general concept of the present invention, there is provided a connector housing assembly comprising: a housing configured to support a connection terminal; and a lock received in a chamber of the housing. The lock is movably installed in the housing and is adapted to be moved between a pre-locking position and a final locking position; The lock is provided with a blocking structure configured to lock the connection terminal when the lock is moved to the final locking position; The housing is provided with an operation port communicated with the chamber, and the lock is pushed to move between the pre-locking position and the final locking position by a tool inserted into the chamber through the operation port.

Figure 2:
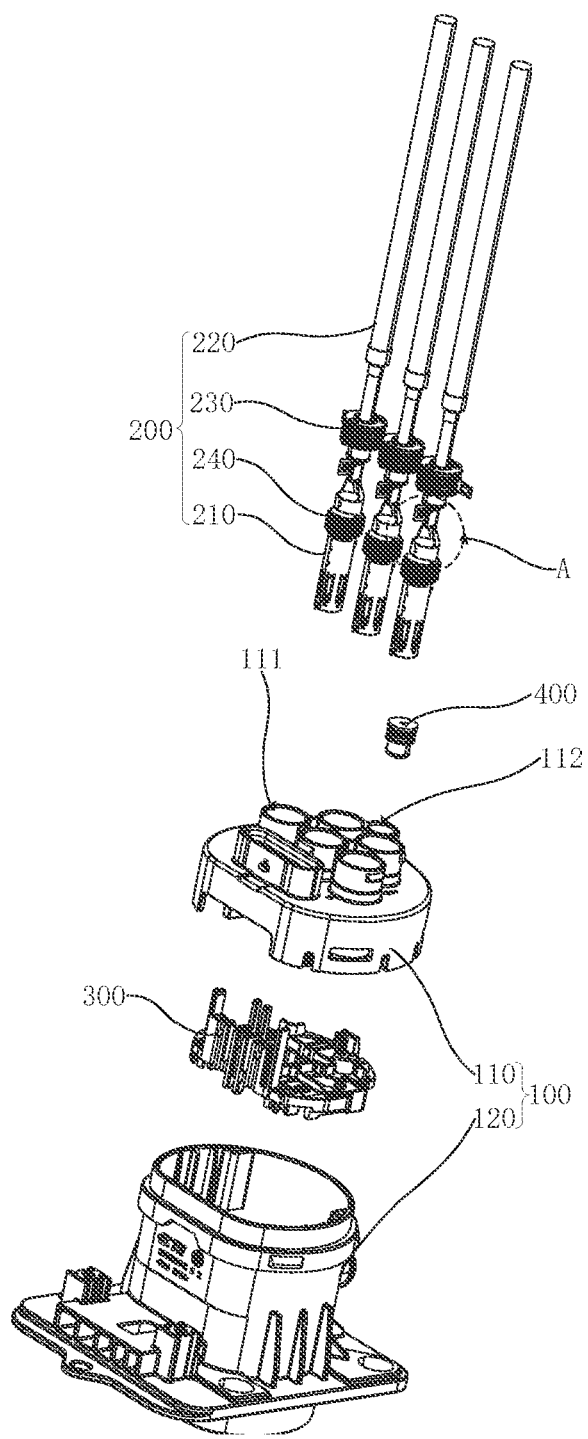
FIG. 2 is an illustrative exploded view of a connector housing assembly according to an exemplary embodiment of the present invention.
Figure 5:
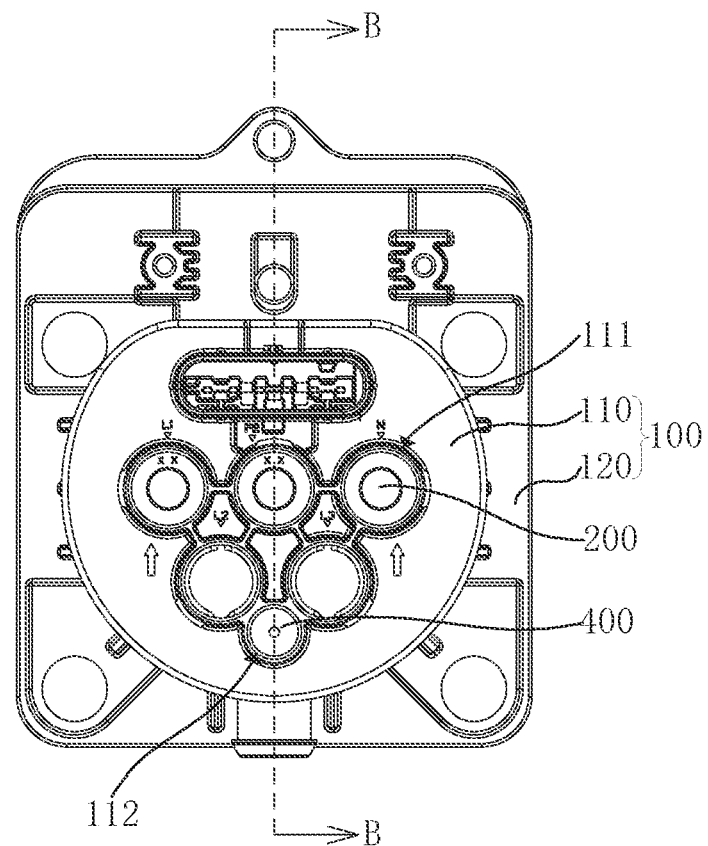
FIG. 5 is a top view of a connector housing assembly according to an exemplary embodiment of the present invention.
Figure 6:
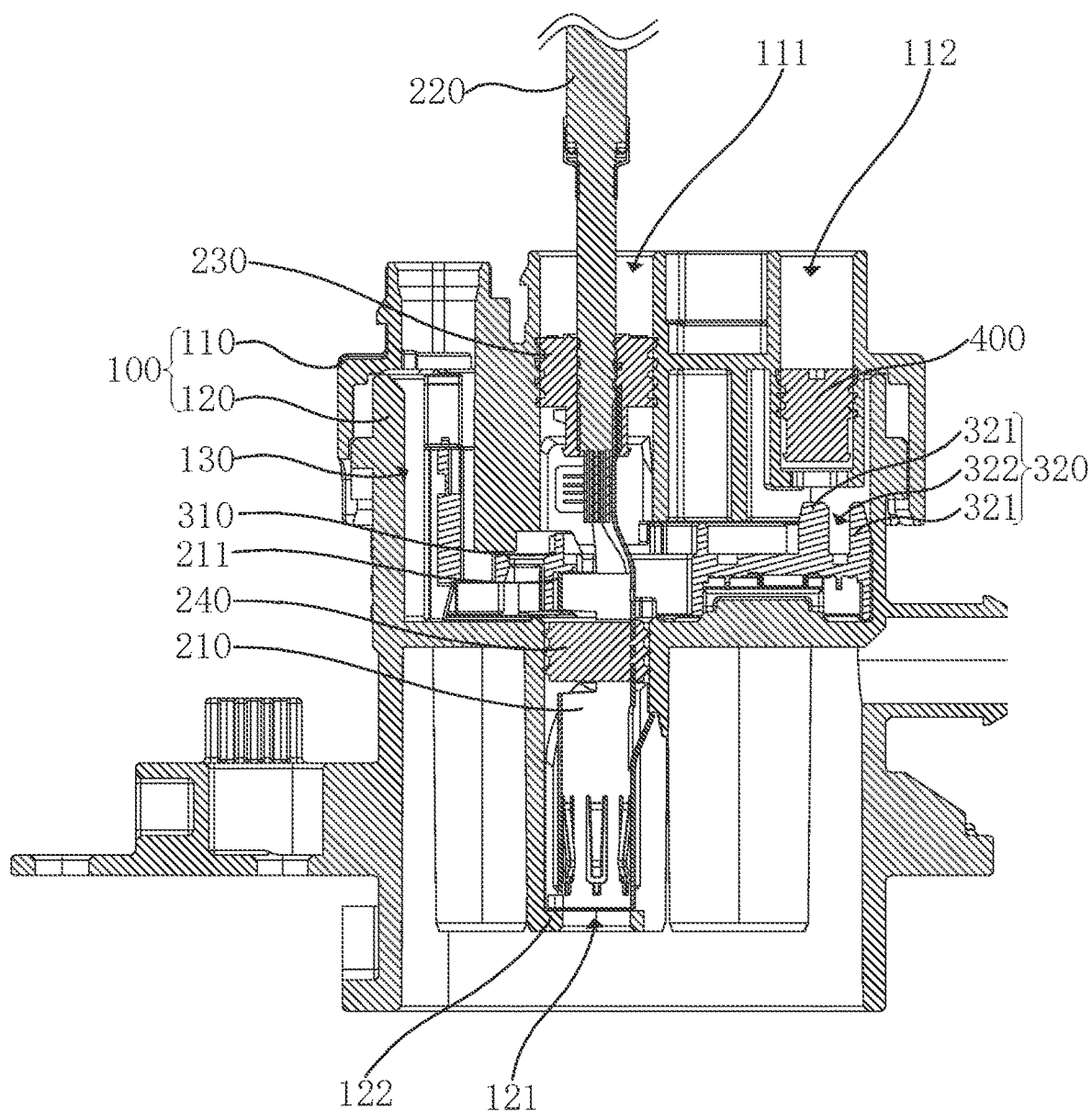
FIG. 6 is an illustrative cross section view of the connector housing assembly along the B-B direction in FIG. 5.

Referring to FIG. 1 and FIG. 2, and in combination with FIG. 5 and FIG. 6, the embodiment of the present invention provides a connector housing assembly, which includes a housing 100 for supporting the connection terminal 210 and enclosing a chamber 130, and a lock 300 arranged in the chamber 130. The lock 300 has at least a pre-locking position and a final locking position in the chamber 130. The lock 300 is movably supported on the housing 100 and can be moved from the pre-locking position to the final locking position. The lock 300 is provided with a blocking structure 310, which locks the connection terminal 210 when the lock 300 moves to the final locking position, so as to position the connection terminal 210 axially and prevent the connection terminal 210 from being pulled out of the chamber 130. The housing 100 is provided with an operation port 112 communicated with the chamber 130, and a tool is inserted into the chamber 130 through the operation port 112 to push the lock 300, so that the lock 300 may be switched between the pre-locking position and the final locking position by the tool. In this embodiment, the tool can be but not limited to a screwdriver. According to the actual situation and the specific requirements, the tool can also be any other suitable tool, which is not limited here.

Compared with the prior art, the connector housing assembly of the embodiment of the present invention is transported to the cable factory after the assembly of the housing 100 and the lock 300. When the cable factory assembles the connection terminal 210, it only needs to insert the connection terminal 210 into the chamber 130, and then uses a tool inserted into the chamber 130 through the operation port 112 to push the lock 300, so that the lock 300 is moved to the final locking position. At this time, the blocking structure 310 locks the connection terminal 210, so as to position the connection terminal 210 axially and prevent the connection terminal 210 from being pulled out of the chamber 130, and thus complete the assembly of the connector housing assembly. In the above assembly process, it is not necessary to disassemble the housing 100, which greatly simplifies the assembly process, improves the assembly efficiency, and effectively improves the production capacity.

Figure 3:
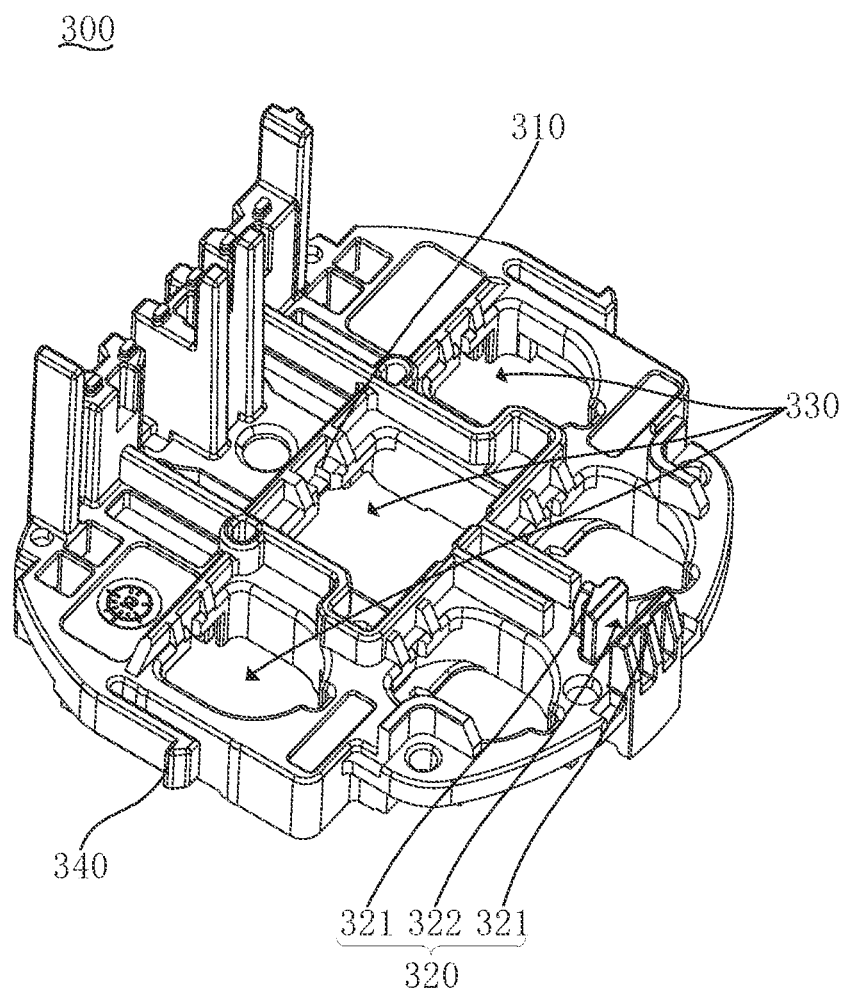
FIG. 3 is an illustrative perspective view of a lock according to an exemplary embodiment of the present invention.

Furthermore, in an exemplary embodiment of the present invention, as shown in FIG. 3 and FIG. 6, an operation part 320 is provided on the corresponding operation port 112 of the lock 300. By pushing the operation part 320 with a tool which is inserted into the chamber 130 through the operation port 112, the lock 300 can be switched between the pre-locking position and the final locking position. In this way, it simplifies the assembly process, improves the assembly efficiency, and effectively improves the production capacity.

Furthermore, in an exemplary embodiment of the invention, as shown in FIG. 3 and FIG. 6, the operation part 320 of the lock 300 and the operation port 112 of the housing 100 are aligned along the axial direction of the connector housing assembly, so that the tool may be inserted into the chamber 130 through the operation port 112 to push the operation part 320.

Furthermore, as an optional embodiment of the present invention, the operation part 320 includes a slot 322 provided on the lock 300. The tool is inserted into the chamber 130 through the operation port 112 and then is inserted into the slot 322. The lock 300 may be moved left and right by the tool, so that the lock 300 may be switched between the pre-locking position and the final locking position.

Furthermore, as an optional embodiment of the present invention, the operation part 320 includes a protruding block 321 formed on the lock 300, and the protruding block 321 is matched with the tool. After the tool is inserted into the chamber 130 through the operation port 112 and butts against the protruding block 321, the lock 300 is moved left and right by the tool. Thus, the lock 300 may be switched between the pre-locking position and the final locking position.

Furthermore, as an optional embodiment of the present invention, as shown in FIG. 3 and FIG. 6, the operation part 320 includes two protruding blocks 321 formed on the lock 300 and spaced from each other. A slot 322 for tool insertion is formed between the two protruding blocks 321. The tool is inserted into the slot 322 after being inserted into the chamber 130 through the operation port 112, and the lock 300 may be moved left and right by the tool. Thus, the lock 300 may be switched between the pre-locking position and the final locking position.

It can be understood that the structure of the operation part 320 may be appropriately modified according to the actual situations and requirements, and there is not specifically limited here.

Furthermore, in an exemplary embodiment of the present invention, the connector housing assembly also comprises a lead frame (not shown), on which a connection circuit is arranged. The lead frame and the lock are formed into a single injection molding piece.

In this structure, the connection terminal 210 extends into the chamber 130, and the connection terminal 210 is electrically connected with the connection circuit on the lead frame, and the connection circuit is used to detect the charging state of the connection terminal 210.

Furthermore, in an exemplary embodiment of the present invention, as shown in FIG. 2 and FIG. 6, the housing 100 comprises a housing seat 120 and a cover 110 which is covered on the housing seat 120. The housing seat 120 and the cover 110 surrounds the chamber 130, and the operation port 112 is arranged on the cover 110. The cover 110 is also provided with a first channel 111, and the housing seat 120 is provided with a second channel 121. One end of the connection terminal 210 extends into the chamber 130 through the first channel 111 and then is inserted into the second channel 121, so that the terminal of the external charging gun can be inserted into the connection terminal 210 through the second channel 121. It can be understood that the structure of the housing 100 may be appropriately modified according to the actual requirements and situations, as long as the connection terminal 210 can be extended into the chamber 130, and the terminal of the external charging gun can be inserted into the connection terminal 210, and there is not specifically limited here.

Figure 4:
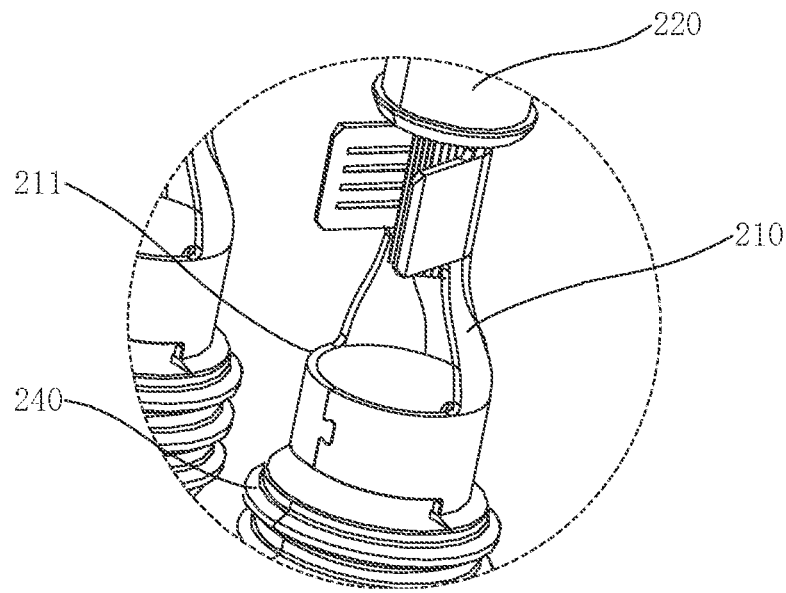
FIG. 4 is an enlarged structural view of area A shown in FIG. 2.

Furthermore, in an exemplary embodiment of the present invention, as shown in FIG. 3, FIG. 4 and FIG. 6, the lock 300 is provided with a terminal avoidance hole 330 for the connection terminal 210 to pass through, and the inner wall of the terminal avoidance hole 330 is provided with a blocking structure 310. In this embodiment, the blocking structure 310 can be, but is not limited to, a boss. The connection terminal 210 is provided with a butting part 211 corresponding to the blocking structure 310. When the lock 300 is moved to the final locking position, the blocking structure 310 is butted against the side of the butting part 211 near the cable 220, so as to prevent the connection terminal 210 from being pulled out of the first channel 111 along the axial direction.

It should be noted that in the connector housing assembly of the embodiment of the present invention, the lock 300 is first placed on the housing seat 120, and then the cover 110 is covered on the housing seat 120, so that the lock 300 is contained in the chamber 130 formed by the housing seat 120 and the cover 110. At this time, the lock 300 is in the pre-locking position in the chamber 130. The blocking structure 310 is arranged to axially avoid the butting part 211, so as to allow the connection terminal 210 to pass through the terminal avoiding hole 330. The connection terminal 210 is inserted through the first channel 111, and the end of the connection terminal 210 away from the cable 220 is extended into the chamber 130 through the first channel 111, and then is extended into the second channel 121; Finally, a tool is inserted into the chamber 130 through the operation port 112, and then the tool is inserted into the slot 322 after being inserted into the chamber 130 through the operation port 112. The tool is used to push the lock 300, so that the blocking structure 310 is moved towards the butting part 211. When the blocking structure 310 butts against the side of the butting part 211 near the cable 220, the lock 300 is moved to the final locking position. When it is necessary to move the lock 300 to the pre-locking position, by pushing the lock 300 with the tool, the blocking structure 310 is moved away from the butting part 211 to axially avoid the butting part 211. At this time, the lock 300 is moved to the pre-locking position, and the connection terminal 210 may be pulled out from the first channel 111 to facilitate the replacement of the connection terminal 210.

Furthermore, in an exemplary embodiment of the present invention, as shown in FIG. 6, the inner wall of the second channel 121 is provided with a step 122, and the end of the connection terminal 210 away from the cable 220 is butted against the step 122, so that the connection terminal 210 can be axially positioned to prevent the connection terminal 210 and the cable 220 from extending out of the second channel 121.

Figure 7:
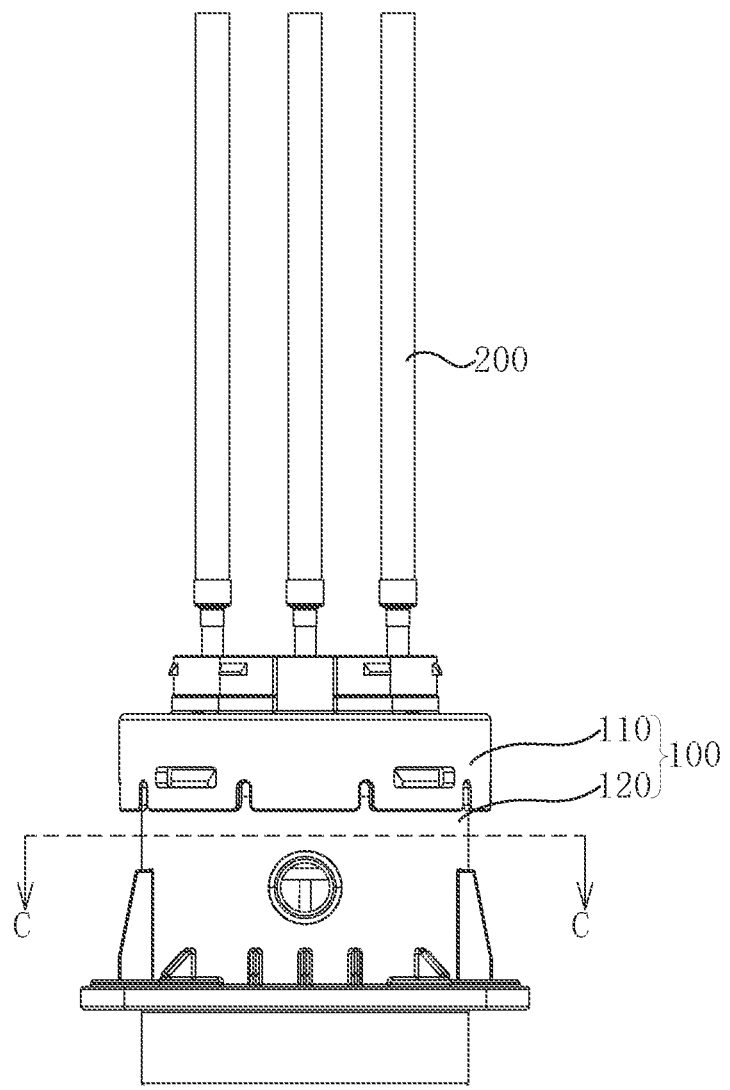
FIG. 7 is a side view of a connector housing assembly according to an exemplary embodiment of the present invention.
Figure 8:
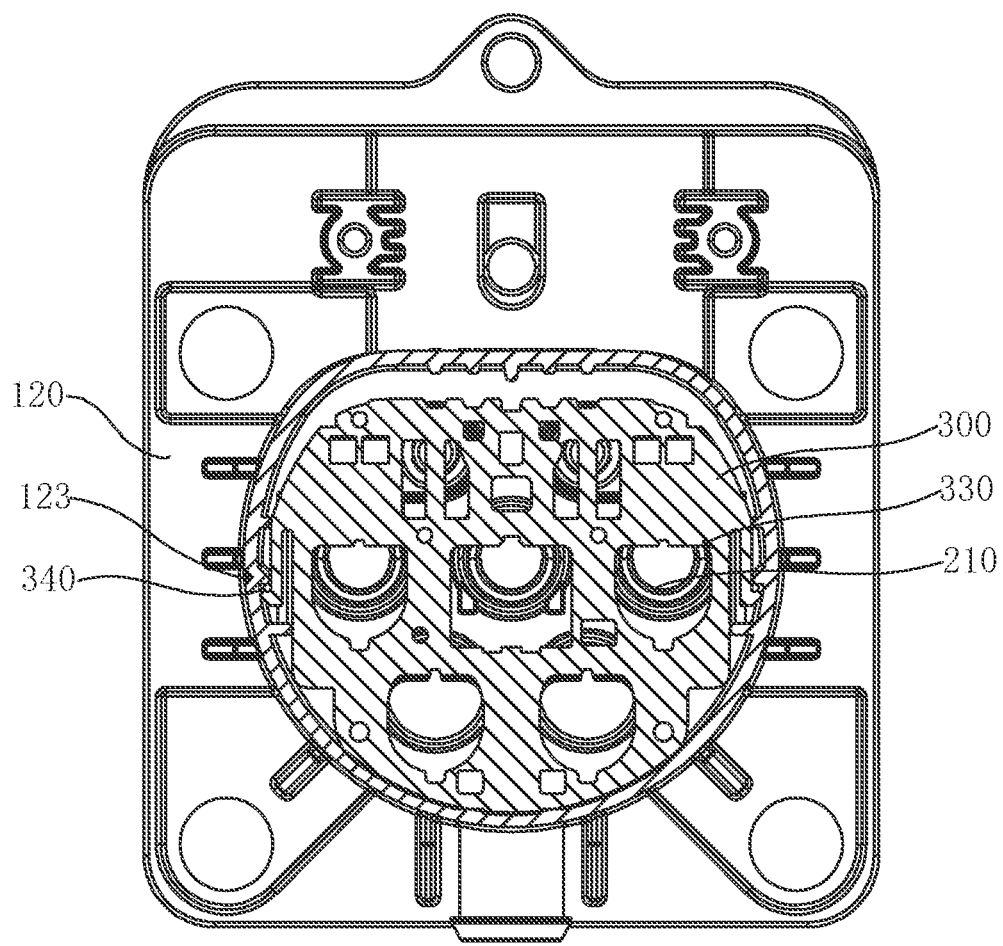
FIG. 8 is an illustrative cross section view of the connector housing assembly along the C-C direction in FIG. 7.

Furthermore, in an exemplary embodiment of the present invention, as shown in FIG. 3, FIG. 7 and FIG. 8, the lock 300 is also provided with a latch 340, and a latch slot 123 corresponding to latch 340 is provided on the side wall of the chamber 130. In an embodiment, the latch slot 123 is arranged on the housing seat 120. When the lock 300 is moved to the final locking position, the latch 340 is clamped in the latch slot 123, so as to temporarily fix the lock 300 in the final locking position. When the lock 300 is moved to the pre-locking position, the latch 340 is separated from the slot 123.

Furthermore, in an exemplary embodiment of the present invention, as shown in FIG. 2 and FIG. 6, the connector housing assembly also includes a blind plug 400 sealed on the operation port 112 to ensure the air tightness of the chamber 130.

Furthermore, in an exemplary embodiment of the present invention, the operation port 112 on the housing 100 is served as an air tightness test channel of the connector housing assembly, that is, the operation port 112 can be used to detect the air tightness of the chamber 130. In an embodiment, the blind plug 400 of the operation port 112 may be taken out, and then gas may be introduced into the operation port 112 to detect the air pressure in the chamber 130. Thus, the air tightness of the chamber 130 may be detected.

In an exemplary embodiment of the present invention, there is also provided a charging socket connector. The charging socket connector includes the connector housing assembly and the connection assembly 200 as described above. The connection assembly 200 includes a connection terminal 210 and a cable 220 electrically connected with the connection terminal 210. The connection terminal 210 is installed in the housing, and the cable 220 extends out of the housing. The charging socket connector of the embodiment of the present invention has simple assembly process and high production capacity.

As an alternative embodiment of the present invention, the connector housing assembly includes three connection assemblies 200. Of course, the number of connection assemblies 200 can be adjusted appropriately according to the actual situations and requirements, as long as the connector housing assembly includes at least one connection assembly 200, and there is not specifically limited here.

Furthermore, in an exemplary embodiment of the present invention, as shown in FIG. 2 and FIG. 6, the cable 220 is hermetically connected to the first channel 111, and the connection terminal 210 is hermetically connected to the second channel 121, which can ensure the air tightness of the chamber 130, prevent water vapor from entering into the chamber 130, and protect the internal components of the chamber 130 from being damaged. It can effectively improve the service life of the connector housing assembly.

Furthermore, in an exemplary embodiment of the present invention, as shown in FIG. 2 and FIG. 6, the end of the cable 220 close to the connection terminal 210 is sleeved with a first waterproof sleeve 230, and the first waterproof sleeve 230 is interference fit in the first channel 111, that is, the first waterproof sleeve 230 is tightly butted against the inner wall of the first channel 111, so that the cable 220 is sealed and connected in the first channel 111. The end of the connection terminal 210 close to the cable 220 is sleeved with a second waterproof sleeve 240, and the second waterproof sleeve 240 is interference fit in the second channel 121, that is, the second waterproof sleeve 240 is closely butted against the inner wall of the second channel 121, so that the connection terminal 210 is sealed and connected in the second channel 121. It can be understood that according to the actual situations and requirements, the cable 220 and the connection terminal 210 may be sealed and connected to the first channel 111 and the second channel 121 respectively in other ways, and there is not specifically limited here.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector housing assembly, comprising:
    a housing configured to support a connection terminal; and
    a lock received in a chamber of the housing;
    wherein the lock is movably installed in the housing and is adapted to be moved between a pre-locking position and a final locking position;
    wherein the lock is provided with a blocking structure configured to lock the connection terminal when the lock is moved to the final locking position; and
    wherein the housing is provided with an operation port communicated with the chamber and the lock is provided with an operation part corresponding to the operation port; and
    wherein a tool inserted into the chamber through the operation port drives the lock to move between the pre-locking position and the final locking position by pushing the operation part.

2. The connector housing assembly according to claim 1, wherein the operation part of the lock is aligned with the operation port of the housing along an axial direction of the connector housing assembly.

3. The connector housing assembly according to claim 1, wherein the operation part comprises a slot provided on the lock, and the tool is adapted to be inserted into the slot of the operation part.

4. The connector housing assembly according to claim 1, wherein the operation part comprises a protruding block formed on the lock, and the protruding block is adapted to match with the tool.

5. The connector housing assembly according to claim 1, wherein the operation part comprises two protruding blocks formed on the lock and spaced from each other, and the tool is adapted to be inserted into a slot defined between the two protruding blocks.

6. The connector housing assembly according to claim 1, wherein the housing comprises a housing seat and a cover covered on the housing seat, the chamber is surrounded by the housing seat and the cover, and the operation port is provided on the cover.

7. The connector housing assembly according to claim 1, further comprising:
a lead frame on which a connection circuit is arranged, wherein the lead frame and the lock are formed into a single integral piece by injection molding.

8. The connector housing assembly according to claim 1, further comprising:
a blind plug adapted to be plugged into and seal the operation port, so as to ensure the air tightness of the chamber.

9. The connector housing assembly according to claim 1, wherein the operation port of the housing is served as an air tightness test channel of the connector housing assembly.

10. A charging socket connector, comprising:
the connector housing assembly according to claim 1; and
a connection assembly comprising a connection terminal and a cable electrically connected to the connection terminal,
wherein the connection terminal is installed in the housing, and the cable extends out of the housing.

11. The charging socket connector according to claim 10, wherein the operation part of the lock is aligned with the operation port of the housing along an axial direction of the connector housing assembly.

12. The charging socket connector according to claim 10, wherein the operation part comprises a slot provided on the lock, and the tool is adapted to be inserted into the slot of the operation part.

13. The charging socket connector according to claim 10, wherein the operation part comprises a protruding block formed on the lock, and the protruding block is adapted to match with the tool.

14. The charging socket connector according to claim 10, wherein the operation part comprises two protruding blocks formed on the lock and spaced from each other, and the tool is adapted to be inserted into a slot defined between the two protruding blocks.

15. The charging socket connector according to claim 10, wherein the housing comprises a housing seat and a cover covered on the housing seat, the chamber is surrounded by the housing seat and the cover, and the operation port is provided on the cover.

16. The charging socket connector according to claim 10, further comprising:
a lead frame on which a connection circuit is arranged, wherein the lead frame and the lock are formed into a single integral piece by injection molding.

17. The charging socket connector according to claim 10, further comprising:
a blind plug adapted to be plugged into and seal the operation port, so as to ensure the air tightness of the chamber.

18. The charging socket connector according to claim 10, wherein the operation port of the housing is served as an air tightness test channel of the connector housing assembly.

* * * * *